United States Patent
Dickenson et al.

(10) Patent No.: US 10,833,869 B2
(45) Date of Patent: Nov. 10, 2020

(54) SECURING GEO-PHYSICAL PRESENCE

(71) Applicant: International Business Machines Corporation, Armonk, NY (US)

(72) Inventors: Marc Dickenson, Austin, TX (US); Igor Ramos, Georgetown, TX (US)

(73) Assignee: International Business Machines Corporation, Armonk, NY (US)

(*) Notice: Subject to any disclaimer, the term of this patent is extended or adjusted under 35 U.S.C. 154(b) by 342 days.

(21) Appl. No.: 15/863,726

(22) Filed: Jan. 5, 2018

(65) Prior Publication Data
US 2019/0215162 A1 Jul. 11, 2019

(51) Int. Cl.
*H04L 9/32* (2006.01)
*H04L 9/06* (2006.01)
*H04W 4/029* (2018.01)

(52) U.S. Cl.
CPC .......... *H04L 9/3247* (2013.01); *H04L 9/0637* (2013.01); *H04L 9/3226* (2013.01); *H04L 9/3228* (2013.01); *H04L 9/3239* (2013.01); *H04L 9/3242* (2013.01); *H04W 4/029* (2018.02); *H04L 2209/38* (2013.01)

(58) Field of Classification Search
CPC ......... G06Q 10/083; H04W 12/00504; H04W 12/005; H04W 4/029; H04L 9/3247; H04L 9/3239; H04L 9/3226; H04L 9/3242; H04L 9/0637; H04L 9/3228; H04L 2209/38
See application file for complete search history.

(56) References Cited

U.S. PATENT DOCUMENTS

| | | | |
|---|---|---|---|
| 8,887,307 B2 | 11/2014 | Chen | |
| 9,111,402 B1 | 8/2015 | Krishnan et al. | |
| 9,351,124 B1 | 5/2016 | Shelton | |
| 9,619,639 B2 | 4/2017 | Donenfeld | |
| 2002/0154777 A1 | 10/2002 | Candelore | |
| 2003/0005324 A1 | 1/2003 | Epstein | |
| 2011/0088083 A1* | 4/2011 | Ficko | G06F 21/34 726/5 |

(Continued)

OTHER PUBLICATIONS

Wikipedia, "Google Authenticator", Wikipedia, https://en.wikipedia.org/wiki/Google_Authenticator, Dec. 15, 2017.

(Continued)

*Primary Examiner* — Alexander Lagor
*Assistant Examiner* — Vu V Tran
(74) *Attorney, Agent, or Firm* — North Shore Patents, P.C.; Joseph L. Acayan

(57) ABSTRACT

Embodiments generally relate to securing a geophysical presence of a user. In some embodiments, a method includes receiving information associated with the user in a physical environment. The method further includes generating a unique pattern in response to receiving the information associated with the user. The method further includes sending encoded information containing the unique pattern to a landmark device in the physical environment, where the encoded information causes the landmark device to present the unique pattern. The method further includes receiving captured data from the physical environment. The method further includes verifying an identity and a physical presence of the user in the physical environment based on the captured data, where the captured data includes the landmark device.

10 Claims, 4 Drawing Sheets

(56) References Cited

U.S. PATENT DOCUMENTS

| | | | |
|---|---|---|---|
| 2011/0306304 A1 | 12/2011 | Forutanpour et al. | |
| 2012/0140993 A1 | 6/2012 | Bruso et al. | |
| 2013/0124411 A1* | 5/2013 | Kobres | G07F 19/20 |
| | | | 705/43 |
| 2014/0108252 A1* | 4/2014 | Itwaru | G06O 20/202 |
| | | | 705/44 |
| 2014/0263618 A1* | 9/2014 | McCarthy | G06Q 40/02 |
| | | | 235/379 |
| 2015/0088751 A1 | 3/2015 | Grigg et al. | |
| 2015/0332283 A1 | 11/2015 | Witchey | |
| 2015/0350225 A1 | 12/2015 | Perold et al. | |
| 2016/0098730 A1* | 4/2016 | Feeney | G06Q 20/3825 |
| | | | 705/71 |
| 2017/0041148 A1 | 2/2017 | Pearce | |
| 2017/0243213 A1* | 8/2017 | Castinado | G06Q 20/352 |

OTHER PUBLICATIONS

List of IBM Patents or Applications Treated as Related.

\* cited by examiner

SECURING GEO-PHYSICAL PRESENCE

BACKGROUND

Proof-of-physical presence is as important as a fraud prevention mechanism in various scenarios. For example, conventional systems use various electronic devices to verify the physical presence of a particular individual. For example, a system may use a biometric scanner that reads physical or biological information such as a fingerprint or retinal scan to authenticate a person's identity. In another example, a system may use a passport reader that reads a radio frequency identification (RFID) chip embedded in a passport or other ID document. Such systems require specialized infrastructure and can be time consuming and costly to install.

SUMMARY

Disclosed herein are a method for securing a geophysical presence of a user, and a system and computer program product as specified in the independent claims. Embodiments are given in the dependent claims. Embodiments can be freely combined with each other if they are not mutually exclusive.

Embodiments use inexpensive technology to dynamically encode information in a physical environment, which a user can capture for verification of physical presence and identity. In an embodiment, a method includes receiving information associated with the user in a physical environment. The method further includes generating a unique pattern in response to receiving the information associated with the user. The method further includes sending encoded information containing the unique pattern to a landmark device in the physical environment, where the encoded information causes the landmark device to present the unique pattern. The method further includes receiving captured data from the physical environment. The method further includes verifying an identity and a physical presence of the user in the physical environment based on the captured data, where the captured data includes the landmark device.

In another aspect, to verify the identity and the physical presence of the user in the physical environment, the method includes analyzing the captured data for the unique pattern at the landmark device, and detecting if there is a match between the unique pattern at the landmark device in the captured data and an expected pattern at the landmark device. In another aspect, to verify the identity and the physical presence of the user in the physical environment, the method includes analyzing the captured data for the unique pattern at the landmark device and for an associated timestamp, and detecting if there is a match between the timestamp associated with the unique pattern at the landmark device in the captured data and a timestamp associated with an expected pattern at the landmark device. In another aspect, the method further includes utilizing a block-chain secure server to ensure that no two or more users claim the captured data from the physical environment. In another aspect, the unique pattern changes over time. In another aspect, the unique pattern is based at least in part on the information associated with a user. In another aspect, the landmark device presents the unique pattern visually. In another aspect, the landmark device presents the unique pattern by sound.

DETAILED DESCRIPTION

Embodiments described herein secure a geophysical presence of a user. Embodiments use inexpensive technology to dynamically encode information (e.g., patterns) into or onto the physical environment (and/or person, object, etc.), which the end-user can capture for verification of physical presence and identity. Embodiments solve the proof-of-physical presence of a person or object problem, while minimizing infrastructure cost by leveraging a user's own device (e.g., phone, tablet, etc.) for capturing data (e.g., photo, movie, audio recording, vibration pattern, etc.) that is injected by a low-cost system in a physical object/environment (landmark object or device).

In some embodiments, a system receives information associated with the user in a physical environment. The system then generates a unique pattern in response to receiving the information associated with the user. The system then sends encoded information containing the unique pattern to a landmark device in the physical environment, where the encoded information causes the landmark device to present the unique pattern. The system then receives captured data from the physical environment. The system then verifies an identity and a physical presence of the user in the physical environment based on the captured data, where the captured data includes the landmark device.

Figure 1:
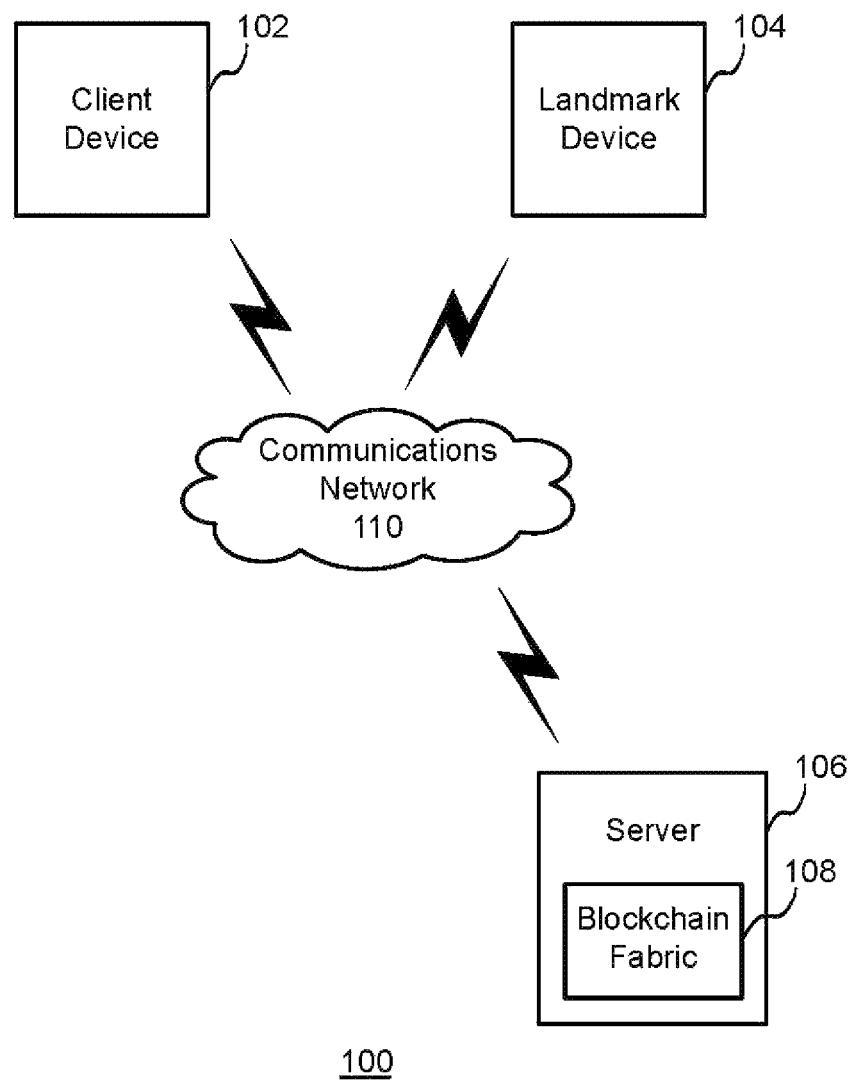
FIG. 1 is an example environment for securing a geophysical presence of a user, according to some embodiments.

FIG. 1 is an example environment 100 for securing a geophysical presence of a user, according to some embodiments. Shown are a client device 102, landmark device 104, a server 106 that includes a blockchain fabric 108, and a communications network 110. The client device 102, the landmark device 104, and the server 106 communicate with each other via the communications network 110. The communications network 110 may be any network such as a wireless local area network (WLAN), the Internet, or any combination thereof including other networks. Example operations involving the client device 102, the landmark device 104, the server 106, and the blockchain fabric 108 are described in more detail herein.

For ease of illustration, FIG. 1 shows one block for each of the client device 102, the landmark device 104, the server 106, and blockchain fabric 108. Blocks 102, 104, 106, and 108 may represent multiple client devices, landmark devices, servers, and blockchain fabrics. In other implementations, environment 100 may not have all of the components shown and/or may have other elements including other types of elements instead of, or in addition to, those shown herein.

While the server 106 performs embodiments described herein, in other embodiments, any suitable component or combination of components associated with the server 106 or any suitable processor or processors associated the server 106 may facilitate performing the embodiments described herein. In various embodiments, the environment 100 may not have all of the components shown and/or may have other elements including other types of components instead of, or in addition to, those shown herein.

In an example scenario, presume that a user is in a contest to win a prize. To win the prize, the user is required to take a selfie that secures their person at a physical location so that a secure transaction may occur (e.g., the user gets the prize), where the contest requires that the user be physically present at the scene in order to complete said transaction. The user may be required to report to a physical public location where a selfie station has been setup that is projecting a unique image that changes every T seconds/minutes etc. The unique pattern may be similar to an Rivest-Shamir-Adleman (RSA) encrypted token (two-factor authentication). Furthermore, the unique background pattern is used in any one location at a time (yet not reused in other locations at the same time). The user may be required to take the selfie in front of the changing unique background prior to executing the transaction. The selfie is then verified that the unique background is expected for that timeframe, and then the transaction may proceed. The application would alert the user if they had not captured a sufficient portion of the background to allow verification of the selfie so that they could readjust the selfie prior to capture.

In an alternative scenario, a unique pattern may be displayed indefinitely until a first user makes a claim. As described in more detail herein, a landmark device may display the unique pattern into the background. In another scenario, the landmark device may display the unique pattern on top of an object or on the person being the subject of the authentication. For example, a light pattern may be projected over a person's face so that the unique pattern may be captured in the photograph. In some embodiments, a single data snapshot may be used (e.g., one picture), or there may be multiple samplings (e.g., two or more photos, or a short movie, etc.). Example embodiments for securing a geophysical presence of a user are described in more detail herein.

Figure 2:
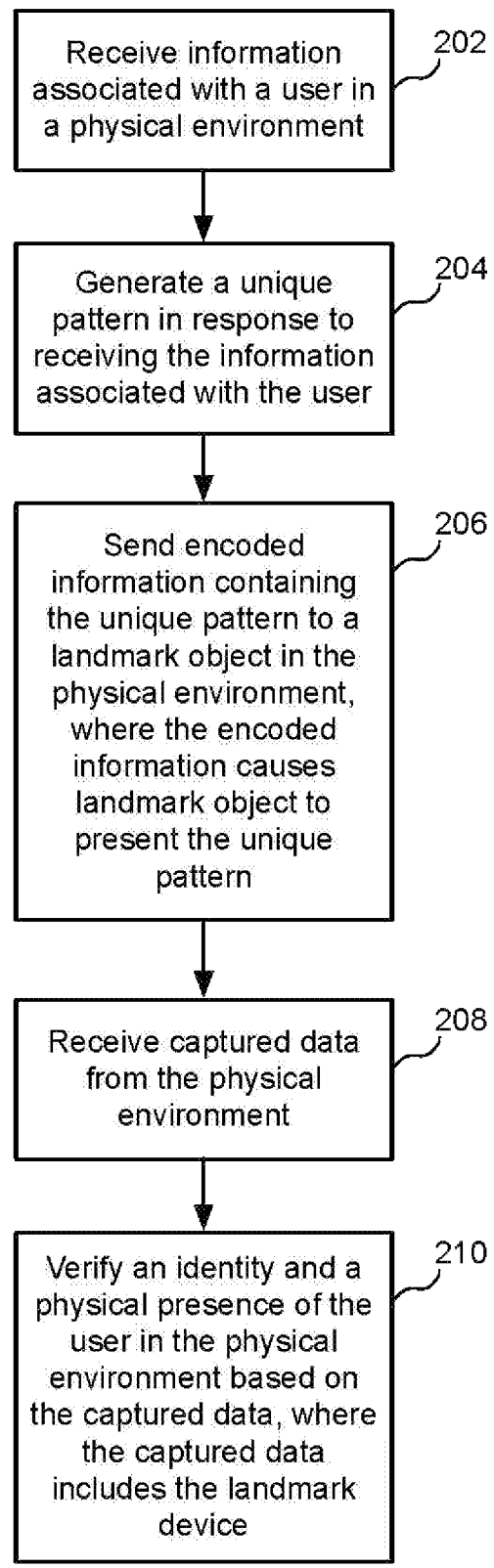
FIG. 2 is an example flow diagram for securing a geophysical presence of a user, according to some embodiments.
Figure 3:
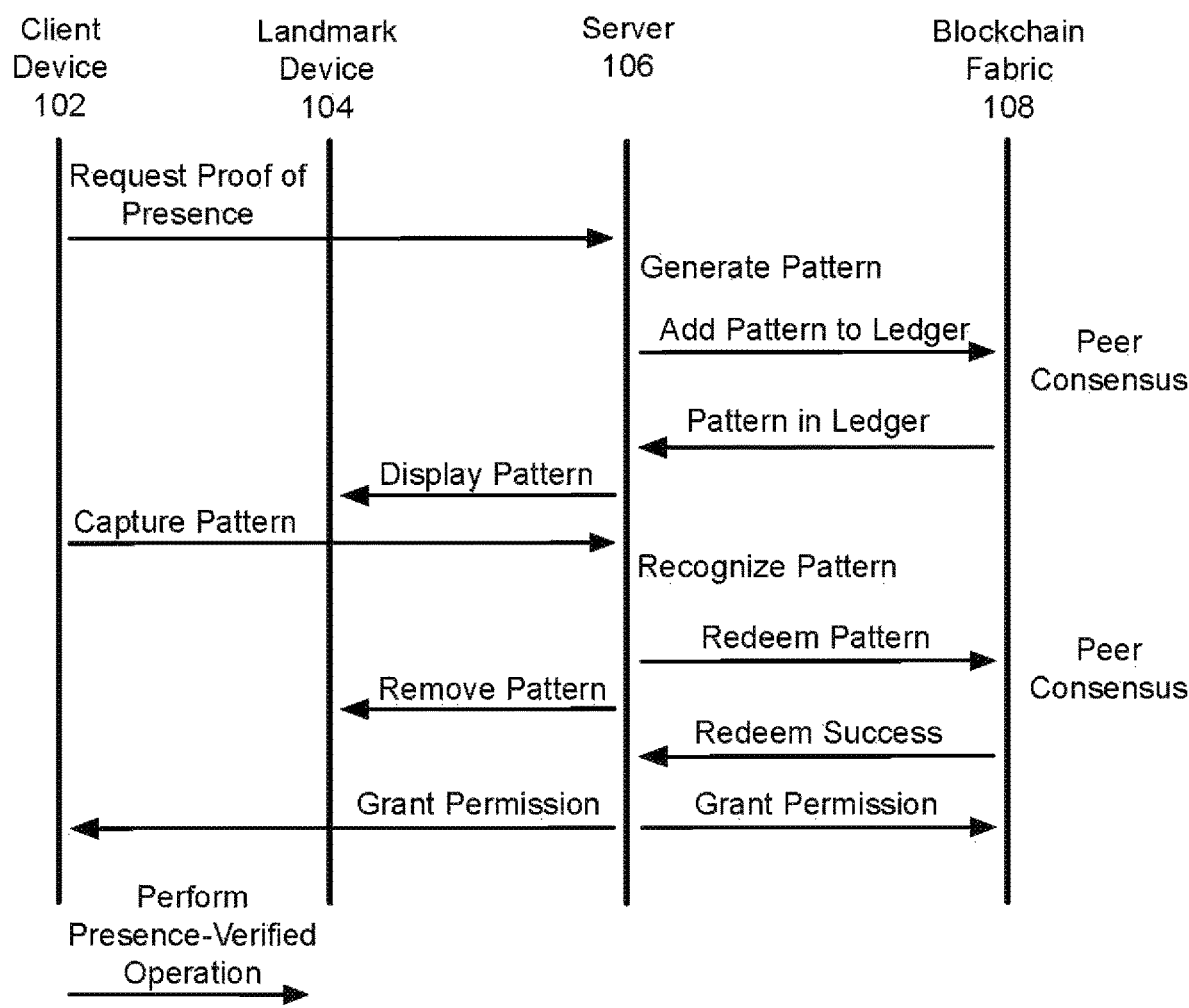
FIG. 3 is an example sequence diagram for securing a geophysical presence of a user, according to some embodiments.

FIG. 2 is an example flow diagram for securing a geophysical presence of a user, according to some embodiments. FIG. 3 is an example sequence diagram 300 for securing a geophysical presence of a user, according to some embodiments. In various embodiments, the sequence diagram 300 of FIG. 3 corresponds to the flow diagram of FIG. 2. As described in more detail herein, the system secures the geophysical presence of a user and prevents global positioning system (GPS) spoofing with a secure block-chain transaction.

Referring to both FIGS. 1, 2, and 3, a method begins at block 202, where a system such as server 106 receives information associated with a user in a physical environment. In some embodiments, the client device 102 may request proof of presence, where the information associated with a user is contained in the request for proof of presence.

At block 204, the server 106 generates a unique pattern in response to receiving the information associated with the user. In various embodiments, the server 106 adds the unique pattern to a ledger at a blockchain fabric 108. In some embodiments, there may be multiple different peer blockchain fabrics that form a consensus that the pattern is indeed unique. The blockchain fabric 108 confirms with the server 106 that the unique pattern is indeed unique, and valid—that is, not yet claimed by another user. This addresses double-spend attacks.

In some embodiments, the unique pattern is based at least in part on the information associated with a user. As such, the server 106 may receive and/or request the identity of the user by means of a unique username and password.

At block 206, the server 106 sends encoded information containing the unique pattern to a landmark device 104 in the physical environment, where the encoded information causes landmark device 104 to present the unique pattern. In an example scenario, a camera of the client device 102 captures a photo of the physical environment with the landmark device 104 in the photo. For example, the user may take a selfie photo with the landmark device 104 (and unique pattern) in the background.

Because the landmark device 104 is displaying the unique pattern, the photo shows the unique pattern. The client device 102 sends the photo with the captured data (unique pattern) from the physical environment to the server 106.

In some embodiments, the landmark device 104 presents the unique pattern visually. In some embodiments, the unique pattern may be displayed using multi-color light emitting diodes (LEDs).

In some embodiments, the landmark device 104 presents the unique pattern by sound, where the unique pattern is a sound pattern that is sounded with a speaker. In this embodiment, the captured data may be sound that the client device records in the physical environment.

In some embodiments, the landmark device 104 presents the unique pattern by vibration. As such, the unique pattern may be a vibration pattern that the landmark device makes using a motor. In this embodiment, the captured data may be the vibration pattern that the client device records in the physical environment.

In some embodiments, the server 106 may encode the information such that the unique pattern changes over time. For example, the unique pattern may change every T seconds or minutes per password algorithm such as HAMC-based one-time password (HOTP). As such, after the user's device captures the pattern, the pattern will change. The next user's device that captures the physical environment will capture a different pattern. In various embodiments, different unique patterns will have different timestamps. This ensures that secure transactions can be taken for an individual to further ensure that the selfie photo captured verify the identity and location prior to granting user permission to a physical or logic asset (e.g., a prize, etc.).

At block 208, the server 106 receives captured data from the physical environment. As described in more detail herein, the server 106 then processes the captured data in order to secure a geophysical presence of a user.

At block 210, the server 106 verifies an identity and a physical presence of the user in the physical environment based on the captured data, where the captured data includes the landmark device. To verify the identity and the physical presence of the user in the physical environment, the system analyzes the captured data for the unique pattern at the landmark device. In various embodiments, the server 106 may recognize the pattern in the captured data by using a visual recognition tool. The server 106 detects if there is a match between the unique pattern at the landmark device in the captured data and an expected pattern at the landmark device, where the expected pattern at the landmark device is the same pattern generated in response to receiving the information associated with the user.

In various embodiments, to verify the identity and the physical presence of the user in the physical environment, the server 106 may also analyze the captured data for the unique pattern at the landmark device and for an associated timestamp. The system detects if there is a match between the timestamp associated with the unique pattern at the landmark device in the captured data and a timestamp associated with an expected pattern at the landmark device.

In various embodiments, if there is a match, the server 106 redeems the unique pattern utilizing a block-chain associated with the blockchain fabric 108 to ensure that no two or more users claim the captured data from the physical environment. In some embodiments, the blockchain fabric 108 determines (and potentially other peer blockchain fabrics form a consensus) that no two or more users claim the captured data from the physical environment, thereby preventing double-spend attacks. The blockchain fabric 108 confirms with the server 106 that that no two or more users claim the captured data from the physical environment. At some point after redeeming the unique pattern, the server 106 causes the landmark device 104 to remove the unique pattern (stop displaying the unique pattern).

In various embodiments, the server 106 causes the unique pattern to be displayed by the landmark device 104 in the physical environment until a first user makes a claim. In some embodiments, the server 106 injects an alternative unique pattern into the physical environment (continually changing the pattern from one unique pattern to the next unique pattern) until all combinations of the unique pattern are exhausted.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

In the following example scenario, embodiments are applied to an interactive candy machine. In some embodiments, a system issues vouchers to be exchanged for free candies for people that are physically located near the machine, and not to someone not attending the event. This creates an incentive for people to post their photos in social networks in exchange for free candy. Also, the system prevents users from using photos from other users to claim a prize. An objective is for every photo to be unique.

In various embodiments, a solution is to encode a unique LED pattern in each photo, so the system can verify each photo as unique and legitimate (e.g., generated at the event, for one user). In this example scenario, the system awards prizes to people that can prove their physical presence (e.g., that the user is physically in front of the machine when a picture is taken).

In another example embodiment, the environment 100 incentivizes people walking by a public demo to take selfies and post that to a social network in order to generate publicity for the exhibit. When a user interacts with a candy machine, which is a landmark device in this example, there will be a request by the candy machine for the user to post a selfie to a social network, using a hashtag (e.g., # free-candy). At that time, the machine makes a hypertext transfer protocol (HTTP) REST call to the server end-point and receives back the color code to be displayed in the 3 light bars (e.g., green, green, red). The pattern expires after 30 seconds, going back to the default pattern. The candy machine stores in memory the displayed color code and time the pattern was shown. Note that if additional security is needed, the candy machine could ask for user's identity (e.g., name, password, etc.) and use that in the pattern generation algorithm, as is done in time-based one-time password algorithm (TOTP) and HOTP. After the pattern is displayed in at landmark device, for the next 5 minutes, the system will scan the social network using the hashtag to look for the image. When the system identifies an image, the system send it to visual recognition to detect the color pattern (and optionally the face of the user). Next, the detected color is cross referenced with the expected pattern that was in memory. If there is a match, that record may be sent to the blockchain fabric. The blockchain fabric ensures that no two or more users send same picture to claim the credit or prize. The blockchain fabric solves the double spending challenge. In this example application, the posted selfie results in one voucher to be issued. This voucher is to be exchanged for candy.

In some embodiments, a portion of a keyed-hash message authentication code (HMAC) may be extracted and converted instead of a 6 digit code, a color pattern, etc. For example, the cognitive candy device may use a 3 multi-color LED, where each LED has 24-bit color and 256 brightness levels. As such, a 6-digit code may be encoded between 3× (e.g., color+brightness. That is more then enough resolution to represent enough unique states. In some embodiments, states may be made distinct enough to account for deficiencies in photo capture (e.g., a given user's camera may saturate some color/brightness combinations).

Embodiments provide various benefits. For example, embodiments reduce geographic location spoofing (e.g., check-ins to claim a reward, etc.). Embodiments provide a blockchain contract mechanism that secures a transaction for a subject with physical presence/geolocation.

Figure 4:
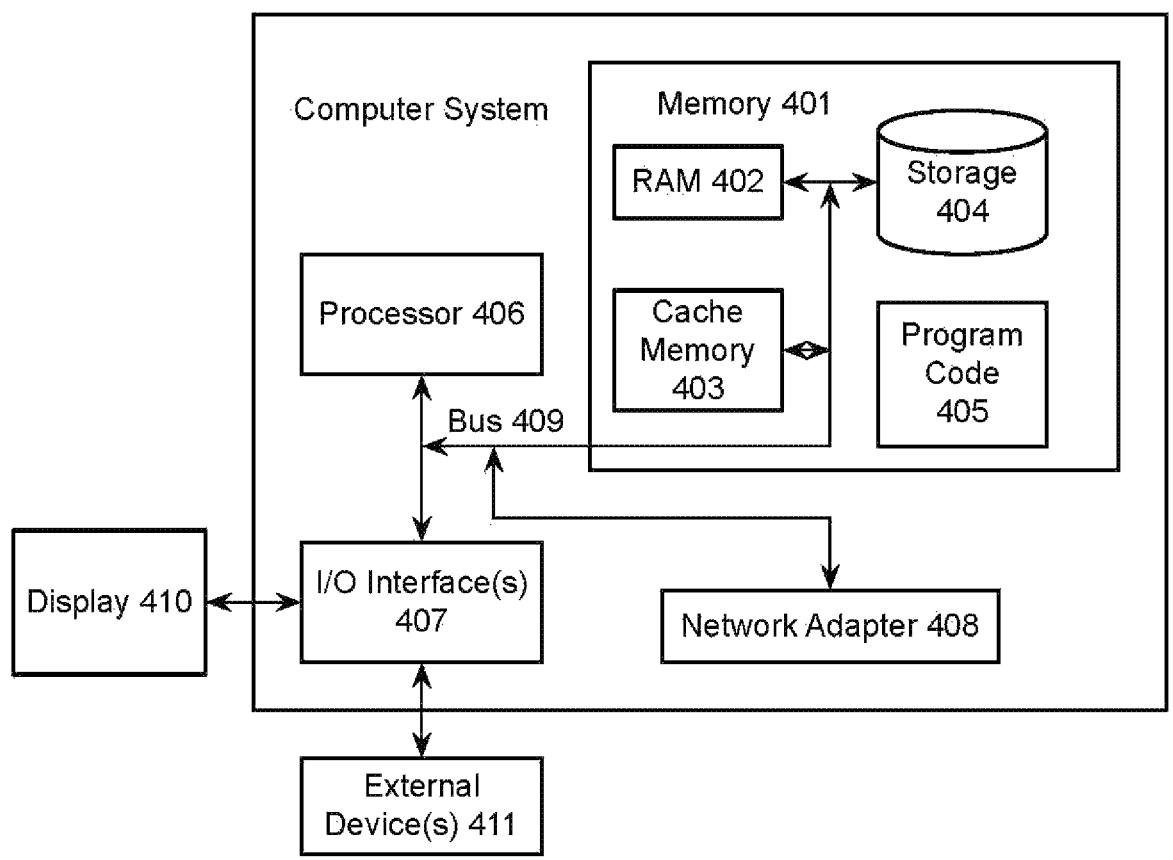
FIG. 4 is a block diagram of an example computer system, which may be used for embodiments described herein.

FIG. 4 is a block diagram of an example computer system 400, which may be used for embodiments described herein. In various embodiments, the server 106 may include a computer system such as computer system 400 according to embodiments of the present invention, as illustrated in FIG. 4. The computer system 400 is operationally coupled to one or more processing units such as processor 406, a memory 401, and a bus 409 that couples various system components, including the memory 401 to the processor 406. The bus 409 represents one or more of any of several types of bus structure, including a memory bus or memory controller, a peripheral bus, an accelerated graphics port, and a processor or local bus using any of a variety of bus architectures. The memory 401 may include computer readable media in the form of volatile memory, such as random access memory (RAM) 402 or cache memory 403, or storage 404, which may include non-volatile storage media or other types of memory. The memory 401 may include at least one program product having a set of at least one program code module 405 that are configured to carry out the functions of embodiment of the present invention when executed by the processor 406. The computer system 400 may also communicate with a display 410 or one or more other external devices 411 via I/O interfaces 407. The computer system 400 may communicate with one or more networks, such as communications network 110, via network adapter 408.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for securing a geophysical presence of a user, the computer program product including at least one non-transitory computer readable storage medium having program instructions embodied therewith, the program instructions executable by at least one processor to cause the at least one processor to perform operations comprising:

receiving, from a client device, user information associated with the user in a physical environment, wherein the user information comprises a unique identifier associated with the user;

generating a unique pattern in response to receiving the information associated with the user, wherein the unique pattern is based on the unique identifier associated with the user;

sending encoded information containing the unique pattern to a landmark device in the physical environment, wherein the encoded information causes the landmark device to present the unique pattern;

receiving captured data from the client device in the physical environment, wherein the captured data comprises the unique pattern presented by the landmark device;

verifying an identity and a physical presence of the user in the physical environment based on the captured data, wherein to verify the identity and the physical presence of the user in the physical environment, the at least one processor further performs operations comprising:

analyzing the captured data for the unique pattern at the landmark device; and detecting if there is a match between the unique pattern at the landmark device in the captured data and an expected pattern at the landmark device; and utilizing a block-chain fabric to ensure that no two or more users claim the captured data comprising the unique pattern.

2. The computer program product of claim 1, wherein to verify the identity and the physical presence of the user in the physical environment, the at least one processor further performs operations comprising:

analyzing the captured data for the unique pattern at the landmark device and for an associated timestamp; and detecting if there is a match between the timestamp associated with the unique pattern at the landmark device in the captured data and a timestamp associated with an expected pattern at the landmark device.

3. The computer program product of claim 1, wherein the at least one processor further performs operations comprising utilizing a block chain secure server to ensure that no two or more users claim the captured data from the physical environment utilizing peer block-chain fabrics to form a consensus that the unique pattern is unique.

4. The computer program product of claim 1, wherein the unique pattern changes over time.

5. The computer program product of claim 1, wherein the unique pattern is based at least in part on the information associated with a user.

6. The computer program product of claim 1, wherein the landmark device presents the unique pattern visually.

7. The computer program product of claim 1, wherein the landmark device presents the unique pattern by sound.

8. A system comprising:

comprising at least one processor and a non-transitory computer readable storage medium having program instructions embodied therewith, the program instructions executable by the first processor to cause the at least one processor to perform operations comprising:

receiving, from a client device, user information associated with the user in a physical environment, wherein the user information comprises a unique identifier associated with the user;

generating a unique pattern in response to receiving the information associated with the user, wherein the unique pattern is based on the unique identifier associated with the user;

sending encoded information containing the unique pattern to a landmark device in the physical environment, wherein the encoded information causes the landmark device to present the unique pattern;

receiving captured data from the client device in the physical environment, wherein the captured data comprises the unique pattern presented by the landmark device;

verifying an identity and a physical presence of the user in the physical environment based on the captured data, wherein to verify the identity and the physical presence of the user in the physical environment, the at least one processor further performs operations comprising:

analyzing the captured data for the unique pattern at the landmark device; and detecting if there is a match between the unique pattern at the landmark device in the captured data and an expected pattern at the landmark device; and utilizing a block-chain fabric to ensure that no two or more users claim the captured data comprising the unique pattern.

9. The system of claim 8, wherein to verify the identity and the physical presence of the user in the physical environment, the at least one processor further performs operations comprising:

analyzing the captured data for the unique pattern at the landmark device and for an associated timestamp; and detecting if there is a match between the timestamp associated with the unique pattern at the landmark device in the captured data and a timestamp associated with an expected pattern at the landmark device.

10. The system of claim 8, wherein the at least one processor further performs operations comprising utilizing peer block-chain fabrics to form a consensus that the unique pattern is unique.

* * * * *